(12) United States Patent
Sabol et al.

(10) Patent No.: US 7,599,365 B1
(45) Date of Patent: Oct. 6, 2009

(54) SYSTEM AND METHOD FOR DETECTING A NETWORK PACKET HANDLING DEVICE

(75) Inventors: Christopher Sabol, San Jose, CA (US); Pasquale Romano, Los Gatos, CA (US); Jaime Fink, Half Moon Bay, CA (US)

(73) Assignee: 2Wire, Inc., San Jose, CA (US)

( * ) Notice: Subject to any disclaimer, the term of this patent is extended or adjusted under 35 U.S.C. 154(b) by 617 days.

(21) Appl. No.: 11/249,989

(22) Filed: Oct. 12, 2005

(51) Int. Cl.
*H04L 12/28* (2006.01)
(52) U.S. Cl. ...................................................... 370/389
(58) Field of Classification Search .................. 370/389
See application file for complete search history.

(56) References Cited

U.S. PATENT DOCUMENTS

2004/0249974 A1* 12/2004 Alkhatib et al. ............. 709/245
2004/0257999 A1* 12/2004 MacIsaac ..................... 370/252
2006/0256815 A1* 11/2006 Kivinen et al. ............... 370/466

OTHER PUBLICATIONS

Goldsmith et al, Firewalking, A Traceroute-Like Analysis of IP Packet Responses to Determine Gateway Access, Cambridge Technology Partners, 14 pages, 1998.*

* cited by examiner

*Primary Examiner*—Frank Duong
(74) *Attorney, Agent, or Firm*—Blakely, Sokoloff, Taylor & Zafman LLP (57) ABSTRACT

A packet handling detection system detects a packet handling device between an originating device and a detection device by analyzing one or more transmission parameters of a packet received at the detection device.

13 Claims, 10 Drawing Sheets

DATA TABLES 402

LOCAL TEST ADDRESS 404

| | | |
|---|---|---|
| 172.16.1.100 | 192.168.1.1 | 10.10.10.10 |
| 172.16.1.200 | 192.168.1.10 | 10.10.10.20 |
| 172.16.1.400 | 192.168.1.20 | 10.20.10.10 |
| . | . | . |
| 172.16.X.X | 192.168.X.X | 10.X.X.X |

ASSIGNED ADDRESS 406

| | |
|---|---|
| PH device: | 192.168.1.254 |
| PC3: | 192.16.1.27 |
| USB Device: | 172.16.1.250 |
| Wireless Device | 10.10.8.1 |
| . | |
| Others: | X.X.X.X |

APPLICATION PORT 408

| APPLICATION | SOURCE PORT |
|---|---|
| VoIP APP | 10001 |
| PtoP APP | 5060 |
| VIDEO APP | 2051 |

ACTIVE: RESET RESULTS 410

| ADDRESS | REPLY | RESULT |
|---|---|---|
| 192.168.1.254 | YES | PASS |
| 192.16.1.27 | YES | PASS |
| 172.16.1.250 | NO | FAIL |
| . | . | . |
| X.X.X.X | YES/NO | PASS/FAIL |

ACTIVE: REDIRECT RESULTS 412

| ADDRESS | REVS | RESULT |
|---|---|---|
| 192.168.1.254 | 5 | PASS |
| 192.16.1.27 | 2 | PENDING |
| 172.16.1.250 | 1 | FAIL |
| 10.10.8.1 | 5 | PASS |
| . | . | . |
| X.X.X.X | | PASS/FAIL |

PASSIVE: PORT TRAN RESULTS 414

| DEST PRT | SRC PRT | RESULT |
|---|---|---|
| 5060 | 5060 | PASS |
| 10000 | 10001 | PASS |
| 2050 | 4500 | FAIL |
| . | . | . |
| XXX | ABC | PASS/FAIL |

PASSIVE: TTL RESULTS 416

| ADDRESS | TTL READ | RESULT |
|---|---|---|
| 192.168.1.254 | 128 | PASS |
| 192.16.1.27 | 64 | PASS |
| 172.16.1.250 | 63 | FAIL |
| . | . | . |
| X.X.X.X | | PASS/FAIL |

SYSTEM AND METHOD FOR DETECTING A NETWORK PACKET HANDLING DEVICE

TECHNICAL FIELD

The present invention relates generally to automatic discovery of network topography and, more specifically, to detecting a packet handling device within a network.

BACKGROUND

Clients may connect to a network, such as an Internet service provider (ISP) digital subscriber line (DSL) network, through a gateway that includes a connection device such as a DSL set-top box. In packet-switched networks such as the Internet, the connection device includes a packet handling device, such as a router. The router may be a separate device or, in some cases, software executed by a computer, that determines the next network point to which a packet should be forwarded toward its destination. The router is connected to at least two networks and decides which way to send each information packet based on its current understanding of the state of the networks it is connected to. A router is located at any gateway (where one network meets another), including each point-of-presence on the Internet. A router is often included as part of a network switch.

BRIEF DESCRIPTION OF THE DRAWINGS

The present invention is illustrated by way of example, and not by way of limitation, in the figures of the accompanying drawings in which.

DETAILED DESCRIPTION

In the following detailed description, numerous specific details are set forth in order to provide a thorough understanding of the invention. However, it will be understood by those skilled in the art that certain embodiments of the invention may be practiced without these specific details. In other instances, well-known methods, procedures, components, and circuits have not been described in detail so as not to obscure the presented embodiments of the invention. The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

Apparatus, systems, and methods are described for a network system that automatically discovers network topology and specifically a packet handling device. A detection device may actively or passively detect the packet handling device between a packet transmission device and the detection device by analyzing at the detection device one or more transmission parameters of a packet sent by the packet transmission device.

A router may also serve as a network address translation (NAT) device for correctly routing incoming and outgoing packet traffic on a network such as an ISP's network. NAT is the translation of an Internet Protocol address (IP address) used within one network to a different IP address known within another network. One network is designated the inside network and the other is the outside. Typically, a company maps its local inside network addresses to one or more global outside IP addresses and unmaps the global IP addresses on incoming packets back into local IP addresses. This helps ensure security since each outgoing or incoming request must go through a translation process that also offers the opportunity to qualify or authenticate the request or match it to a previous request. NAT also conserves on the number of global IP addresses that a company needs and it lets the company use a single IP address in its communication with the world. NAT is included as part of a router and is often part of a corporate firewall. NAT can be statically defined or it can be set up to dynamically translate from and to a pool of IP addresses.

Packet handling devices, such as a router or a router including network address translation (NAT), on a network manipulate network packets as they flow through a network. In a number of circumstances, these manipulations and/or re-mappings can prevent network applications from operating correctly. In particular, if more than one packet handling device manipulates packets as they flow between a client and a server, the set of applications that may operate correctly is the intersection of applications that operate correctly with each individual box within the network pathways. As a result, it is difficult for technical support services remote from the client and/or server to diagnose and provide support to products and applications when the client may be behind multiple packet handling devices.

Additionally, a user may set up additional private networks behind the ISP's Internet connection device (e.g., DSL set-top box) using one or more secondary routers/NAT devices. Because the connection device only has 'visibility' to the internal network addresses of the secondary router/NAT devices, the additional clients are invisible to the ISP. Consequently, if the service provider may not be able to charge an additional service fee for the client's Internet connectivity through the secondary router/NAT devices.

Figure 1:
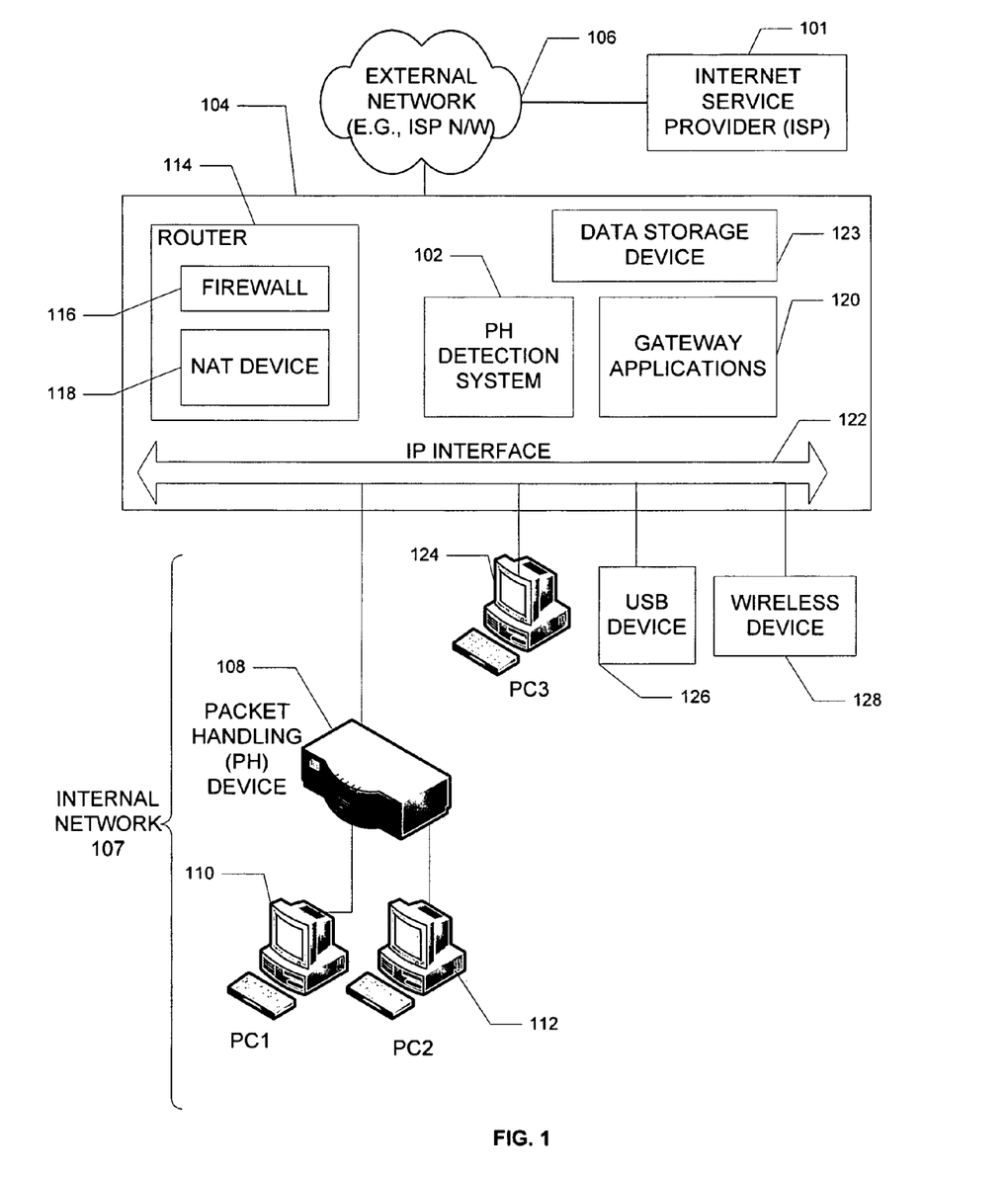
FIG. 1 is a block diagram illustrating a network topography that includes a packet handling (PH) detection system, according to one embodiment of the invention.

FIG. 1 is a block diagram illustrating a network topography that includes a packet handling (PH) detection system 102, according to one embodiment of the invention. The PH detection system 102 may be located in a gateway 104. The gateway 104 is a node on an external network 106 that serves as an entrance/exit to/from an internal network 107. In other embodiments, the PH detection 102 is locatable in any packet handling device within a network, such as at a network edge.

In an enterprise, according to one embodiment, the gateway 104 is a computer that routes the traffic directly from a workstation, such as PC1 110 or PC2 112, or through a packet handling (PH) device 108 within the internal network 107 to the external network 106. In another embodiment, for household connectivity the external network 106 may provide connectivity between the gateway 104 and a service provider such as an ISP (Internet service provider) 101, which in turn provides the gateway 104 and its users (e.g., PC3 124, etc.) connectivity to the Internet.

The gateway 104 also includes its own packet handling device in router 114, in addition to gateway applications 120, IP (internet protocol) interface 122, and data storage device 123. Router 114 includes a firewall 116 and a NAT device 118. A system designed to prevent unauthorized access to or from a private network. The firewall 116 may be implemented in hardware or software, or a combination of both and is used to prevent unauthorized Internet users from accessing private networks connected to the Internet. The gateway applications 120 may include, among others, management and web server applications and link manager services, configured to manage incoming and outgoing traffic, and overall operation and data associated with the gateway 104.

In varying embodiments, the gateway applications 120, router 114, or PH detection system 102 may use the data storage device 123 to permanently or temporarily store any one of initialization data for the gateway 104, connectivity information for devices on the internal network 107 or on the external network 106, and internally generated data from processing network traffic in gateway 104, including processing by the PH detection system 102. The storage device 123 may be of any type known in the art, such as a hard drive or volatile or non-volatile memory device, and may be configured into a database format including data tables or other computer accessible format. In another embodiment, all or a portion of the data (e.g., internally generated data) may be stored on a second storage device (not shown) located at the ISP 101, wherein data may flow between the storage device 123 and the second storage device via the external network 106 by any protocol know in the art (e.g., HTML, etc.).

The IP interface 122 is an IP port (bridging layer) that provides the physical interfaces of the internal network 107 side of gateway 104 a common internal address for the gateway 104. For example, FIG. 1 shows four separate physical interfaces connecting to the IP interface 122; the connection to PH device 108, PC3 124, USB (universal serial bus) device 126, and wireless device 128. Although four separate physical interfaces, each device will direct their respective outgoing packets to the common internal address corresponding to the gateway 104.

Since the gateway 104 is physically connected to the PH device 108 and not to the PC1 110 or PC2 112 the gateway 104 does not have any 'visibility' to PC1 110 or PC2 112. In other words, the gateway is isolated from any device residing behind the PH device 108, or any other packet handling device within internal network 107, because all traffic entering or leaving the PH device 108, regardless of the source or destination (e.g., PC1 110), appears to be from or destined for the address of PH device 108. The PH detection system 102 addresses this problem by analyzing packet traffic from the devices of the internal network 107 using the system and methods described herein to determine whether or not the packets came from a packet handling device, such as PH device 108.

Figure 2:
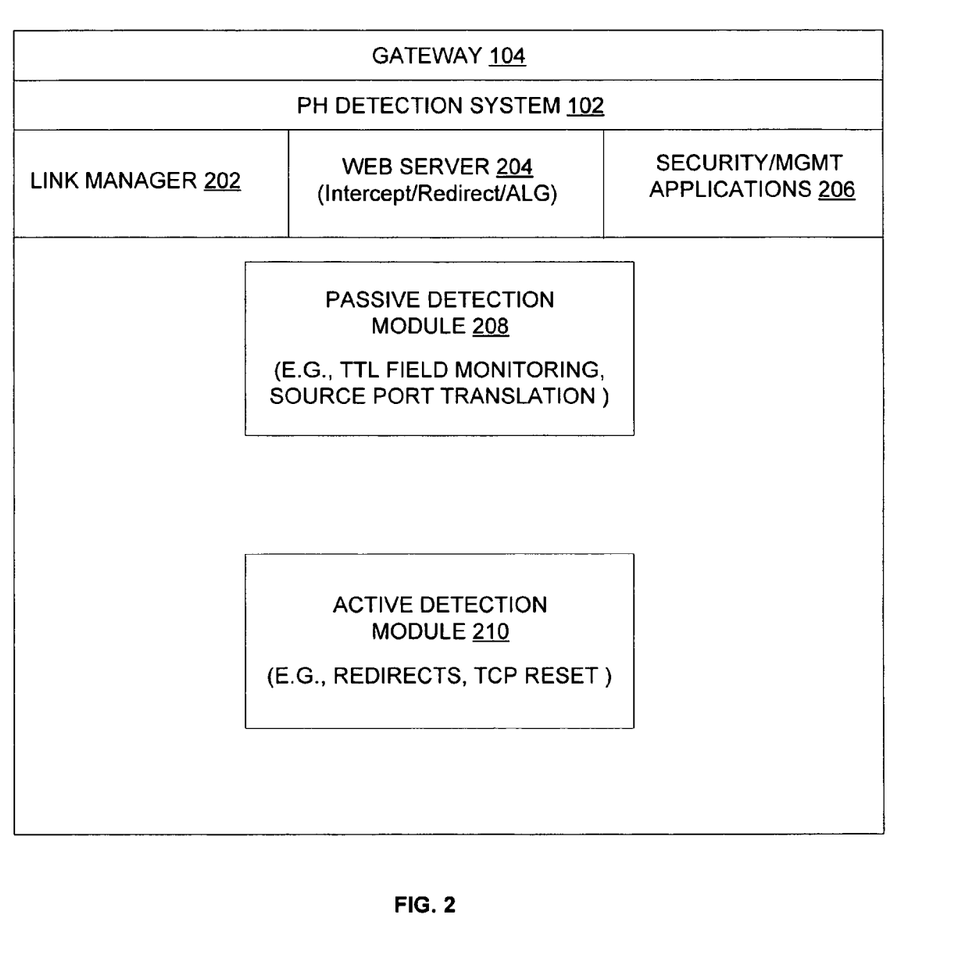
FIG. 2 is a diagram illustrating applications and modules associated with the PH detection system of the gateway, according to one embodiment of the invention.

FIG. 2 is a diagram illustrating applications and modules associated with the PH detection system 102 of the gateway 104, according to one embodiment of the invention. PH detection system 102 includes link manager 202, web server 204, security and management applications 206, passive detection module 208, and active detection module 210. Although the link manager 202, the web server 204, the security and management applications 206 are each shown under the PH detection system 102, these applications and modules may also be used by other components and systems of the gateway 104. For example, router 114 may utilize the link manager 202 and web server 204 to route web traffic or a user interface application may use web server 204 to provide a display of the gateway 104's configuration page, etc. The functions and processes carried out by the applications and modules associated with the various embodiments of the methods and systems disclosed herein are by way of example only, and it can be appreciated by those skilled in the art these functions and processes may be implemented or co-implemented in other applications and modules in the gateway 104 or other similar network edge device.

The link manager 202 may be configured to enable or disable the passive detection module 208 and the active detection module 210 on the PH detection system 102 of gateway 104. In one embodiment of the invention, when the link manager 202 enables a detection module (e.g., 208, 210) it is also provides required configuration information and/or parameters to run each module to detect the PH device 108 within the internal network 107. The link manager 202 also manages the communications associated with the IP interface 122 of the gateway 104, which includes managing the gateway 104's routing tables (not shown).

The required configuration information and/or parameters are dependent on the packet handling device detection mechanism. For example, in TTL based detection the parameters are TTL thresholds and values that are considered default PC initial TTL values; in TCP redirect based detection, the parameters are the network addresses used for redirects, the number of networks to check per client, the order in which to check them, the timeout period for detection, and/or the web server URL to redirect to; for port translation the parameters are the port values and/or range combinations to look for (e.g. look for packets with server port set to 5000, and client port in the range 10000-65000); and for TCP reset, the parameters are a detection timeout value, the amount of time delayed between reset transmission and resumption of data transmission, and/or the number of times to retransmit the reset packet.

The web server 204 provides a configuration page to configure the gateway 104 and may also intercept and redirect web traffic from a user within the internal network 107. The web server 204 may also be configured to make a connection to the external network 106 based on a user's http request from within the internal network 107.

The security and management applications 206 may be configured to analyze the results obtained from the passive detection module 208 and the active detection module 210, as described in further detail below. Additionally, the security and management applications 206 may work along with firewall 116 in screening content received from a user's http request to a location on the external network 106.

The passive detection module 208 and/or the active detection module 210 may be activated and configured by link manager 202. The activation command may be controlled by an automated test sequence algorithm configured to systematically use passive and active methods described herein to detect the PH device 108 within internal network 107. In other embodiments, the automated test sequence algorithm, or an individual or group of detection modes, may be triggered from an external source, such as the ISP 101, or may be triggered based on internal events within the internal network 107 and/or the gateway 104, such as periodic testing based on a timer algorithm, etc.

Figure 4:
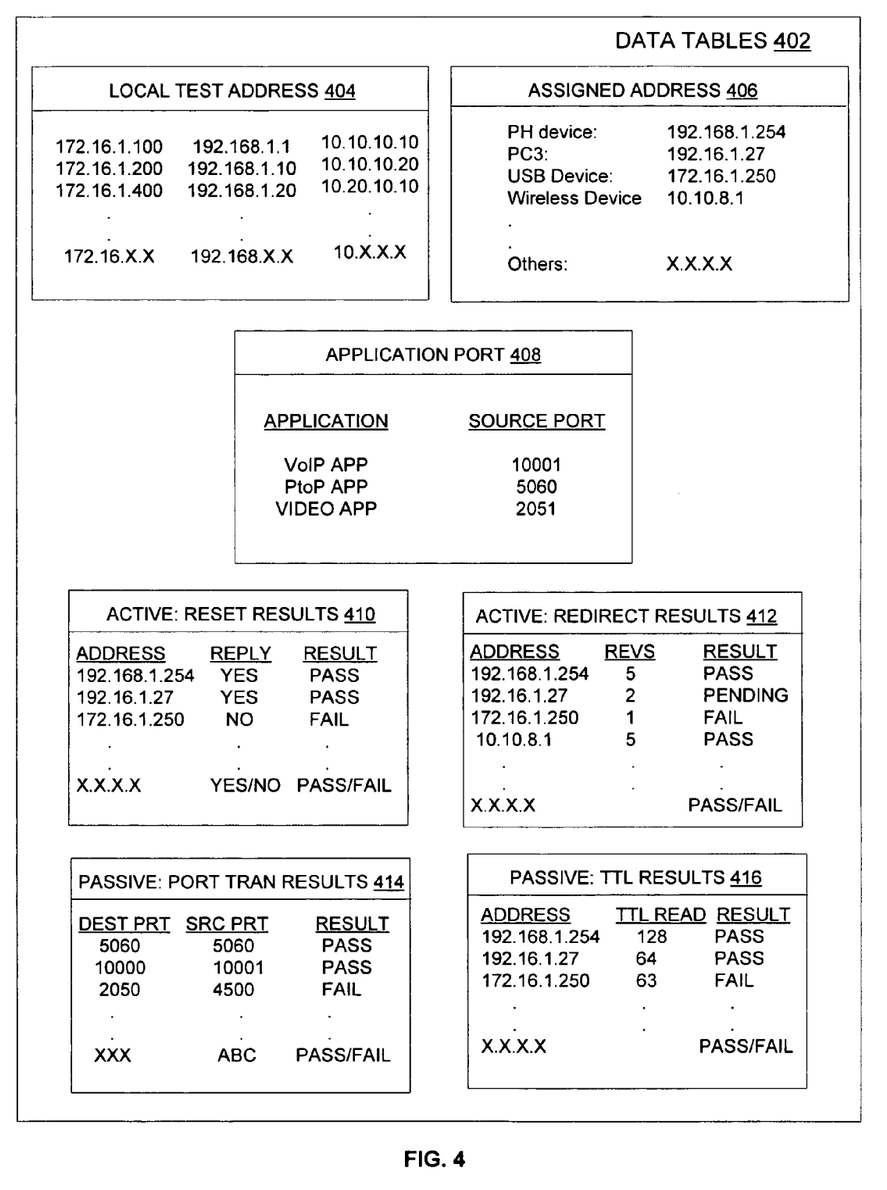
FIG. 4 illustrates data tables for storing data associated with processing traffic though the gateway to actively and passively test for packet handling devices, according to one embodiment of the invention.

FIG. 4 illustrates data tables 402 for storing data associated with processing traffic though the gateway 104 to actively and passively test for packet handling devices, according to one embodiment of the invention. Some or all data within any of the tables may be stored locally in the gateway 104 or communicated through the external network 106 to ISP 101 or other location to be stored and/or further processed.

Figure 3A:
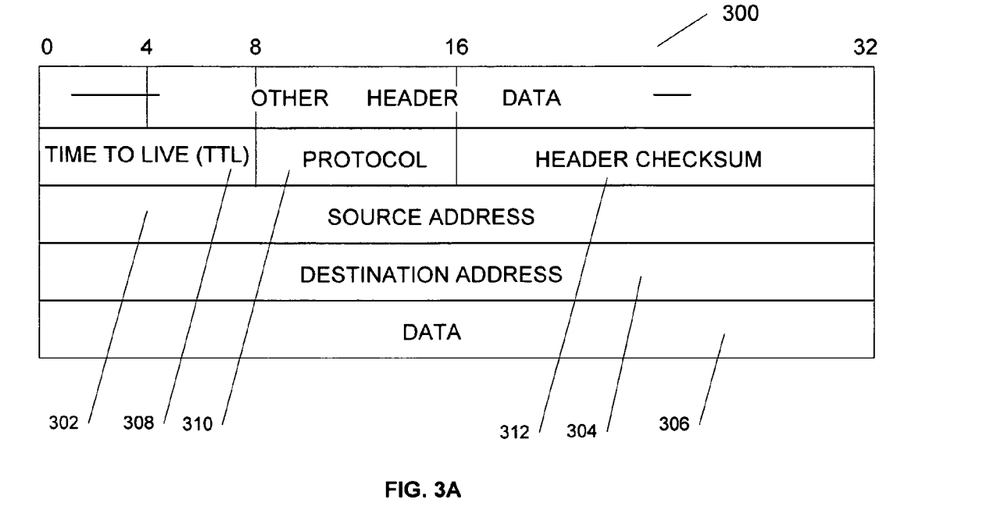
FIG. 3A is a partial illustration of fields within a packet header, including the TTL value, according to one embodiment of the invention.

The passive detection module 208 may be activated to detect the PH device 108 using at least one of the independent passive detection methods. The first passive detection method relies on most PC operating systems setting an initial TTL (time to live) value of packets they send to one of three standard values: 255, 128, or 64. FIG. 3A is a partial illustration of fields within a packet header 300, including the TTL value 308. As packets flow through the network, the TTL value 308 of each packet header 300 is decremented once for each intervening router (e.g., PH device 108), thus providing an indication of how long the packet has been between the source and destination. For example, a packet originating from PC1 110 may have an initial TTL value of 64 but is decremented after passing through the PH device 108 to a value of 63. Therefore, if the packet is observed in the gateway 104 with a TTL other than 255, 128, or 64, the packet may have originated behind a router or NAT device, such as the PH device 108. The simple action of correlating this information with the gateway 104's routing table allows the PH detection system 102 to determine if the intervening router (e.g., PH device 108) is a simple router or a NAT router. The results of the passive TTL detection method may be stored in the TTL results table 416 and, in one embodiment, transmitted to the ISP 101 alerting the ISP 101 to an intervening packet handling device in internal network 107.

Figure 3B:
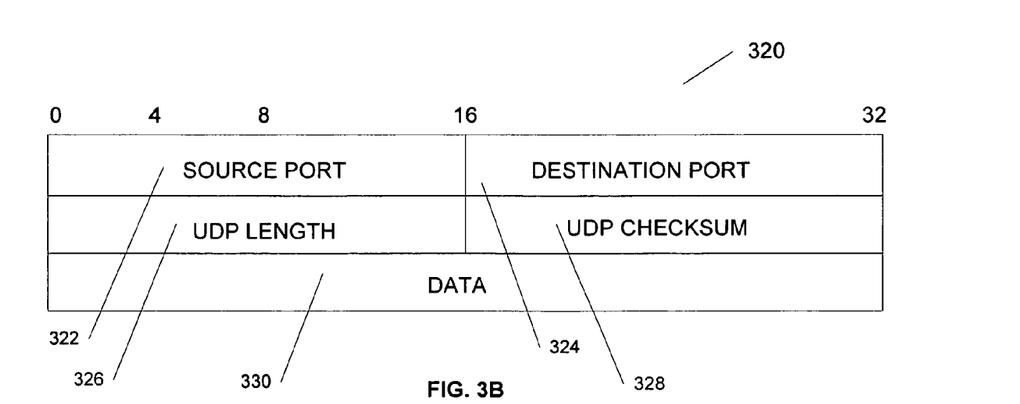
FIG. 3B is an illustration of a UDP (user datagram protocol) header, according to one embodiment of the invention.

The second passive detection method looks for source port translation in packets that include source and destination port data in a header, such as a UDP (user datagram protocol) header 320 as illustrated in FIG. 3B. UDP is used for exemplary purposes only, other packet types that include a source and destination port field is within the scope of the invention, such as a TCP packet or a session initiated protocol (SIP) packet running over UDP or TCP, etc.

The UDP header 320 consists of four fields, a source port 322, a destination port 324, a UDP length 326, and a UDP checksum 328, each 2 bytes in length, and a data field 330, if any. The source port in UDP packets from a client is uses as a service access point (SAP) to indicate the session on the local client that originated the packet. UDP packets from a server carry the server SAP in this field. The destination port in UDP packets from a client is used as a SAP to indicate the service required from the remote server. UDP packets from a server carry the client SAP in this field. The UDP length 326 is the number of bytes comprising the combined UDP header information and data 330. The UDP checksum 328 is a checksum to verify that the end to end data has not been corrupted by routers or bridges in the network or by the processing in an end system. The algorithm to compute the checksum is a standard internet checksum algorithm.

The values of the destination port 324 and the source port 322 may be associated with specific applications. Packets from the multiple PC's, PC1 110 and PC2 112, routed through the PH device 108 are remapped to use the same IP address. If the source ports within each packet from PC1 110 and PC2 112 are the same, the source ports must be translated to be unique in order for the application to work correctly. In other words, no two sessions or connections through the PH device 108 may have the same port at the same time. Therefore, the passive detection module using source port translation can examine the source port 322 of a packet and compare its value to a value, or range of values, associated with a specific application to detect source port translation. The application and associated port values may be kept in a table such as application port table 408 and the results in port translation results table 414. In one embodiment, by detecting the translation of known source ports associated with respective applications, the presence of the PH device 108 can be detected and associated data relayed back to the ISP 101.

In one embodiment of the invention, the active detection module 210 via the link manager 202, activates or enables a first active detection method, the TCP redirect method. There is a number of common "private" network address ranges that may be assigned by the NAT device 118 and PH device 108 to the devices connected to them, such as wireless device 128 and PC1 110, respectively. For example, the NAT device 118 assigns a "private" network address 192.168.1.254 for the PH device 108 as shown in assigned address table 406. However, the private network addresses assigned by the PH device 108 is not visible to the gateway 104 including the NAT device 118. For example, PC1 110 and PC2 112 may be assigned a private network address 172.16.1.250 and 172.16.1.100, respectively, by the PH device 108. Although PH device 108 updates its local routing tables to note that its private network is directly connected to the PC1 110 and PC2 112, it does not notify, nor are the local routing tables visible to, the gateway 104.

The PC1 110 may send all traffic directed to the private network of PH device 108 directly to the connected network, and all other traffic to the NAT router. For example, PC1 110 may send data packets to the destination address associated with PC2 112 and the PH device 108 appropriately directs the traffic to PC2 112 based on its local routing tables. However, if the destination address is not within the private network of PH device 108, the traffic is outgoing traffic and is directed to the gateway 104.

The TCP redirect method uses this behavior to determine if the PC1 110 is behind PH device 108. The PH detection system 102 of gateway 104 intercepts outgoing traffic originating from a device behind PH device 108, such as PC1 110, via web server 204. The outgoing traffic is then sequentially redirected by the web server 204 to each of the standard private IP addresses found in the local test address table 404. If a device (e.g., PC1 110) is not behind the PH device 108, the redirects will happen correctly, quickly, and transparently.

For example, PC3 124 has its traffic intercepted and redirected to standard IP addresses found in the local address table 404, as described above. Because PC3 124 is directly connected to the gateway 104 via the IP interface 122, the PC3 123 will respond correctly to all the redirects provided by web server 204. After which the traffic will be directed to its original destination and the IP address of PC3 124 will be entered into a redirect results table 412.

If, however, the PC1 110 is behind the PH device 108 that is using one of the standard network ranges (i.e., the range that includes the address of PC2 112), the PC1 110 will not respond to the web server 204. This is because the PC1 110 will try to connect directly over the local network that includes the PH device 108, PC1 110, and PC2 112 and not send the traffic through to the gateway 104, and more specifically the NAT router 118 and the PH detection system 102. This results in a timeout since a response is never received at the PH detection system 102. In various embodiments, the timeout period is configurable and may programmable from a remote location, such as ISP 101 or locally on the gateway 104 through an interface such as a configuration page. Thus, detection of the PH device 108 is accomplished by noting which device IP address does not correctly complete the redirection sequence within the timeout period.

There is no limit to the size of the local test address table 404. However, there may be a practical limit set by the browser and/or in how much time is used to conduct the test such that it may be desirable to execute a finite number of redirects. For example, a browser may have a redirect limit of 15 to prevent an infinite redirect loop. Therefore, in one embodiment, the PH detection system 102 may execute less than 15 redirects before a final redirect to the intended address (e.g., Internet site). In such a case, according to one embodiment, redirect results table 412 may indicate, "pending," meaning the IP address has neither passed nor failed. In one embodiment, the PH detection system 102 may store which redirect addresses have been tested (not shown) and/or how many tests revs have been executed on a pending address so as to not duplicate those addresses on a future test and may communicate any or all of that information to the ISP 101. How often the PH detection system retests a pending IP address and how many sessions of redirect tests must complete successfully to a "pass" is a design choice. Furthermore, the initiation of a test or retest may be automated (e.g., via an algorithm) or manually executed from the gateway 104 or from a remote location such as ISP 101. In other embodiments, whether passed or failed, the PH detection system 102 may store which redirect addresses have been tested and may communicate that information to the ISP 101.

In one embodiment of the invention, the active detection module 210 via the link manager 202, activates or enables a second active detection method, the reset method. The TCP protocol specification states that a received TCP reset that is outside of the active sequence space must be ignored. Packet handling devices (e.g., packet handling device 108), such as a NAT and/or Firewall, keep state on TCP connections and use reset packets to clean up the state. Most packet handling devices are not intelligent enough to honor the semantics that require the reset to be honored only when a reset request with a sequence number which falls within a small valid range. Additionally, other non-packet handling devices, such as PC3 124, USB device 126, and wireless device 128 are configured to ignore reset requests.

In one embodiment, in response to a connection request from PC1 110, the PH detection system 102, via the passive detection module 208, sends a reset with an invalid sequence number back to PC1 110. After sending the reset, the PH detection system 102 sends a request (e.g., a redirect in the case of a HTTP connection) and if there is an intervening packet handling device 108 (e.g., NAT and/or firewall router) that destroys the session when the reset is received, the client will never receive the request and the PH detection system 102 will detect a timeout condition. In various embodiments, the timeout period is configurable and may programmable from a remote location, such as ISP 101 or locally on the gateway 104 through an interface such as a configuration page.

If, however, there is no intervening PH device 108 (i.e., PC3 124 was probed) the reset packet will be correctly ignored and the following request (e.g., a redirect) will be honored. Thus, detection of the PH device 108 is accomplished by noting which device IP address does not correctly respond to the request sent after the reset packet within the timeout period. As with the other active and passive tests, the results will be similarly stored in a reset results table 410, which may also be communicated, stored and/or processed further at a remote location such as ISP 101.

Figure 5:
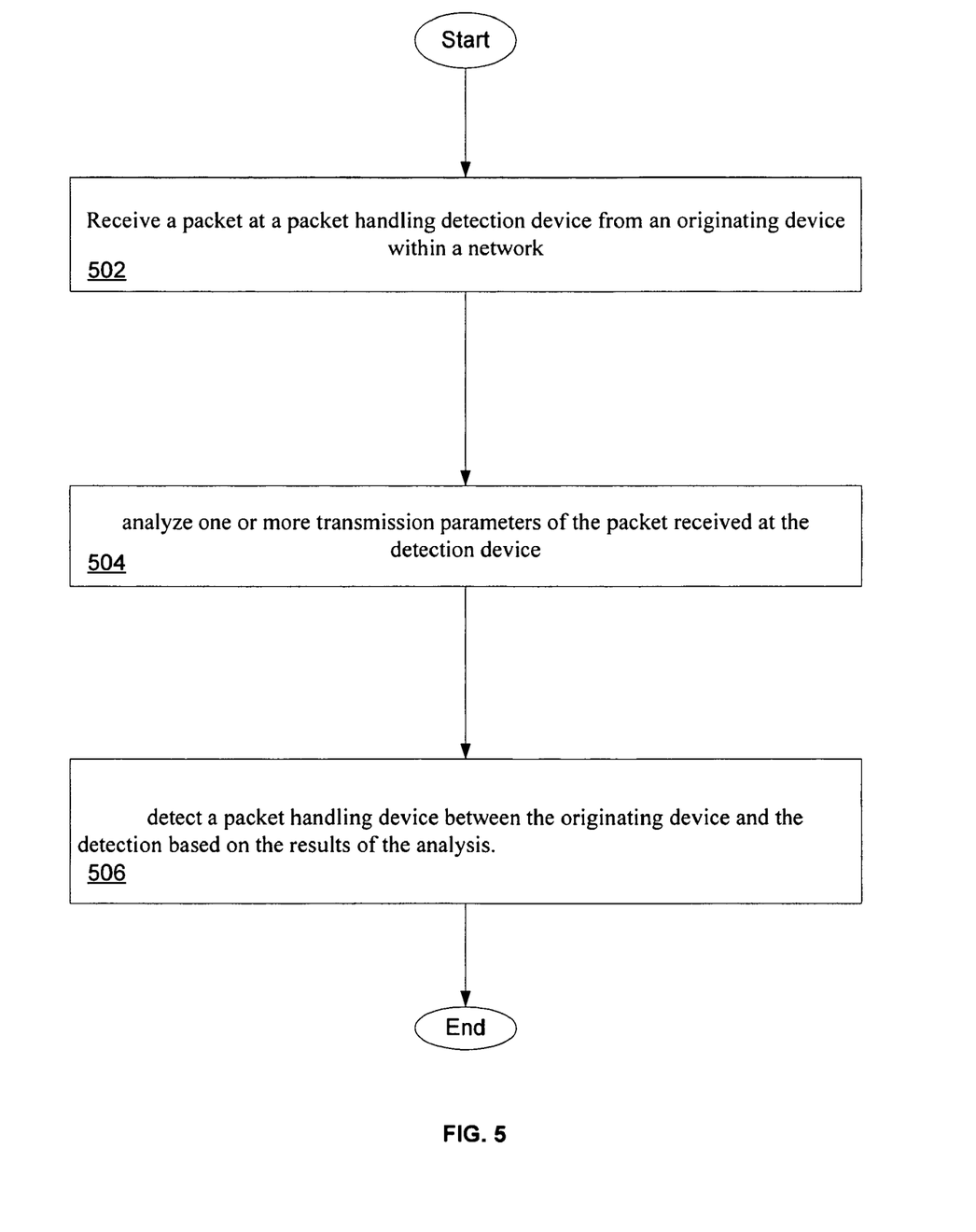
FIG. 5 is a flow chart illustrating operations to detect the packet handling device 108 within the internal network using the packet handling detection system 102, according to one embodiment of the invention.

FIG. 5 is a flow chart illustrating operations to detect the packet handling device 108 within the internal network 107 using the packet handling detection system 102, according to one embodiment of the invention. At operation 502 a packet is received at a packet handling detection device (e.g., PH detection system 102 of the gateway 104) from an originating device (e.g., PC1 110) within a network (e.g., internal network 107). Next, at operation 504, one or more transmission parameters of the packet received at the detection device are analyzed according to the methods described herein. Lastly, at operation 506, a packet handling device may be detected between the originating device and the detection based on the results of the analysis.

Figure 6:
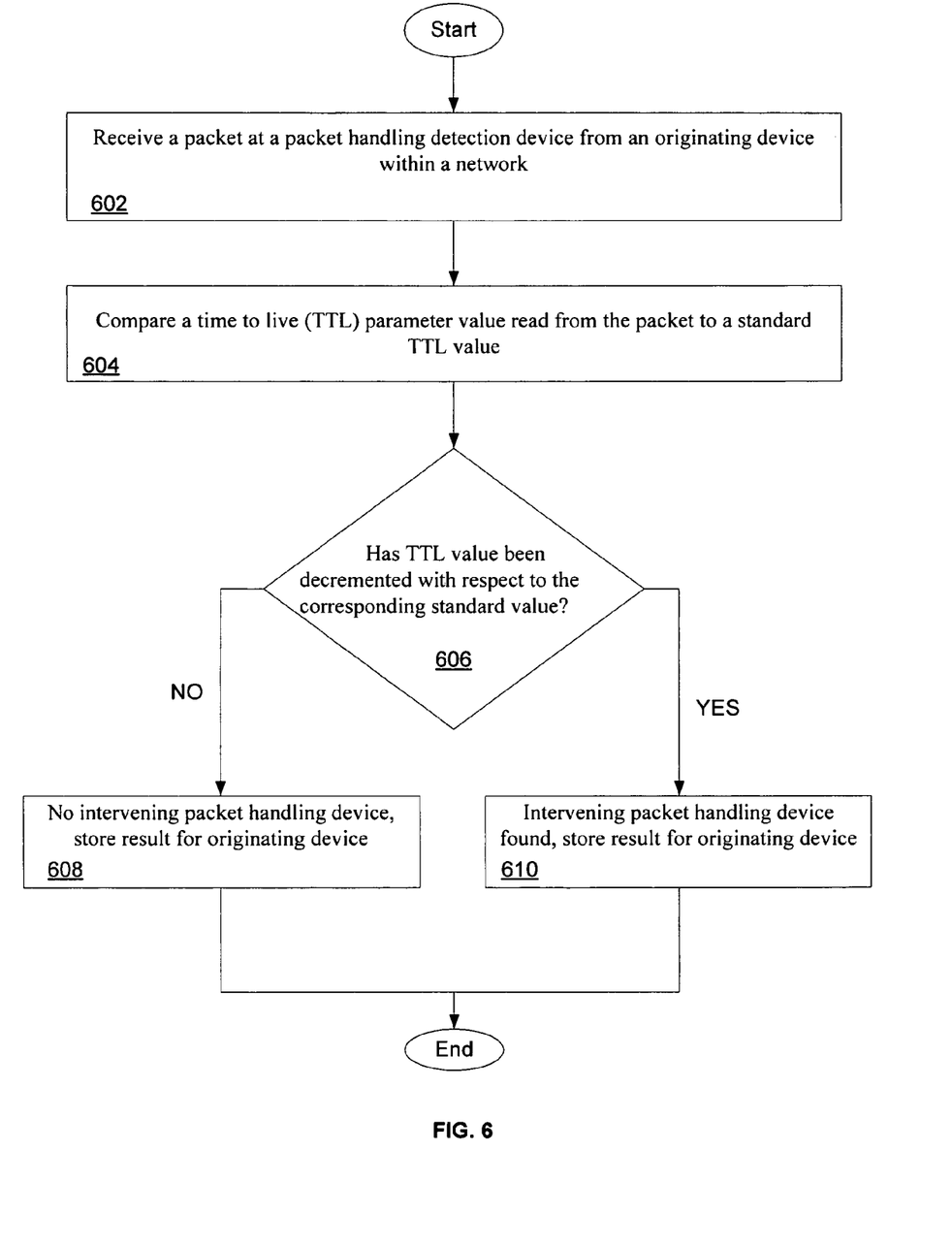
FIG. 6 is a flow chart illustration operations pertaining to detecting a packet handling device using a passive detection method of monitoring TTL (time to live) values in packets received at a detection device, according to one embodiment of the invention.

FIG. 6 is a flow chart illustration operations pertaining to detecting a packet handling device using a passive detection method of monitoring TTL (time to live) values in packets received at a detection device, according to one embodiment of the invention. At operation 602, a packet at a packet handling detection device is received from an originating device within a network. At operation 604 and 606, a time to live (TTL) parameter value read from the packet and compared to a standard TTL value to determine if it has been decremented with respect to the corresponding standard value. If the TTL has been decremented, at operation 608, an intervening packet handling device has been detected and the results are stored for the originating device to indicate it has failed and thus the originating device is behind the intervening packet handling device. If the TTL value has not been decremented, at operation 610, no intervening packet handling device has been detected and the results are stored for the originating device to indicate it has passed and thus the originating device is not behind the intervening packet handling device.

Figure 7:
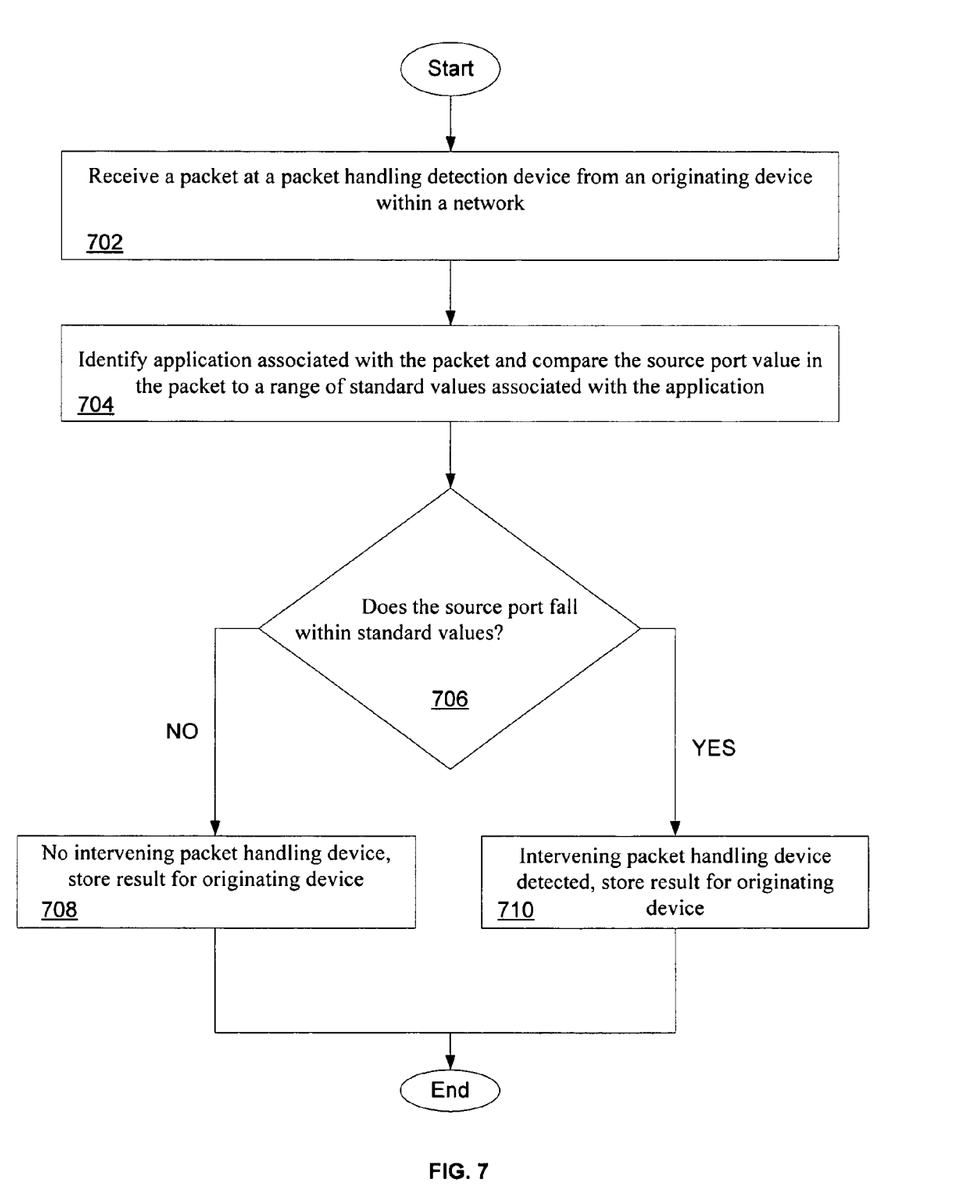
FIG. 7 is a flow chart illustration operations pertaining to detecting a packet handling device using a passive detection method of monitoring source port translation in packets that include source and destination port data received at a detection device, according to one embodiment of the invention.

FIG. 7 is a flow chart illustration operations pertaining to detecting a packet handling device using a passive detection method of monitoring source port translation in packets that include source and destination port data received at a detection device, according to one embodiment of the invention. At operation 702, a packet at a packet handling detection device is received from an originating device within a network. At operation 704 and 706, an application associated with the packet is identified and the source port value in the packet is compared to a range of standard values associated with the application to check if the source port value corresponds to the standard value range. If the source port does not correspond with the standard value range, at operation 708, an intervening packet handling device has been detected and the results are stored for the originating device to indicate it has failed and thus the originating device is behind the intervening packet handling device. If the source port does correspond with the standard value range, at operation 710, no intervening packet handling device has been detected and the results are stored for the originating device to indicate it has passed and thus the originating device is not behind the intervening packet handling device.

Figure 8:
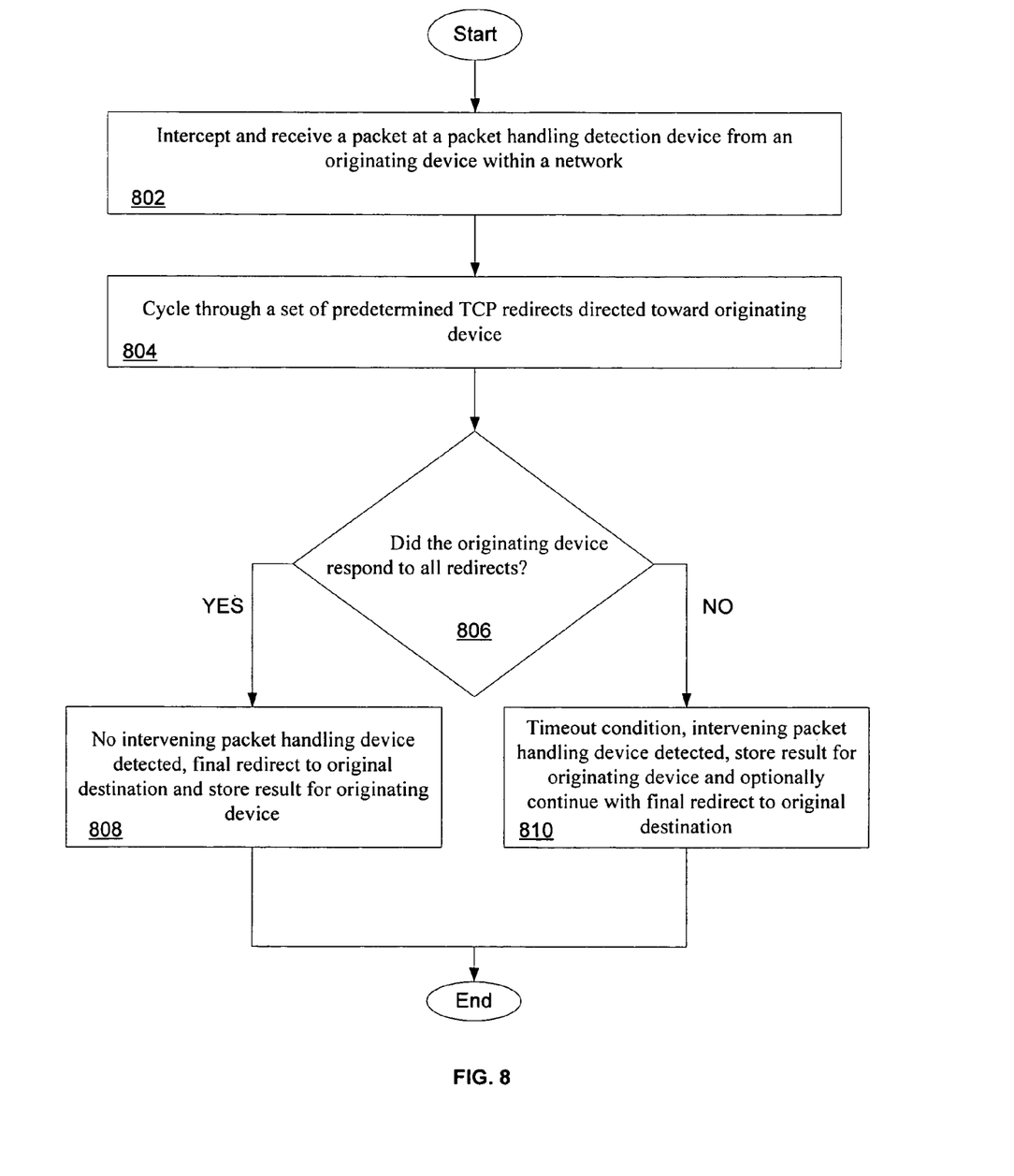
FIG. 8 is a flow chart illustration operations pertaining to detecting a packet handling device using an active detection method of monitoring for responses associated with one or more TCP redirects to an originating device, according to one embodiment of the invention.

FIG. 8 is a flow chart illustration operations pertaining to detecting a packet handling device using an active detection method of monitoring for responses associated with one or more TCP redirects to an originating device, according to one embodiment of the invention. At operation 802, a packet at a packet handling detection device is received from an originating device within a network. At operation 804 and 806, a set of predetermined TCP redirects are directed toward the originating device and the packet handling detection device monitors for a response from the originating device to all redirects. If all redirects are responded to by the originating device, at operation 808, then no intervening packet handling device is detected and a final redirect to original destination is made and the result is stored for originating device. However, if a timeout occurs because not all redirects are responded to by the originating device, at operation 810, then an intervening packet handling device is detected, the result is stored for originating device, and a final redirect to original destination may optionally be made.

Figure 9:
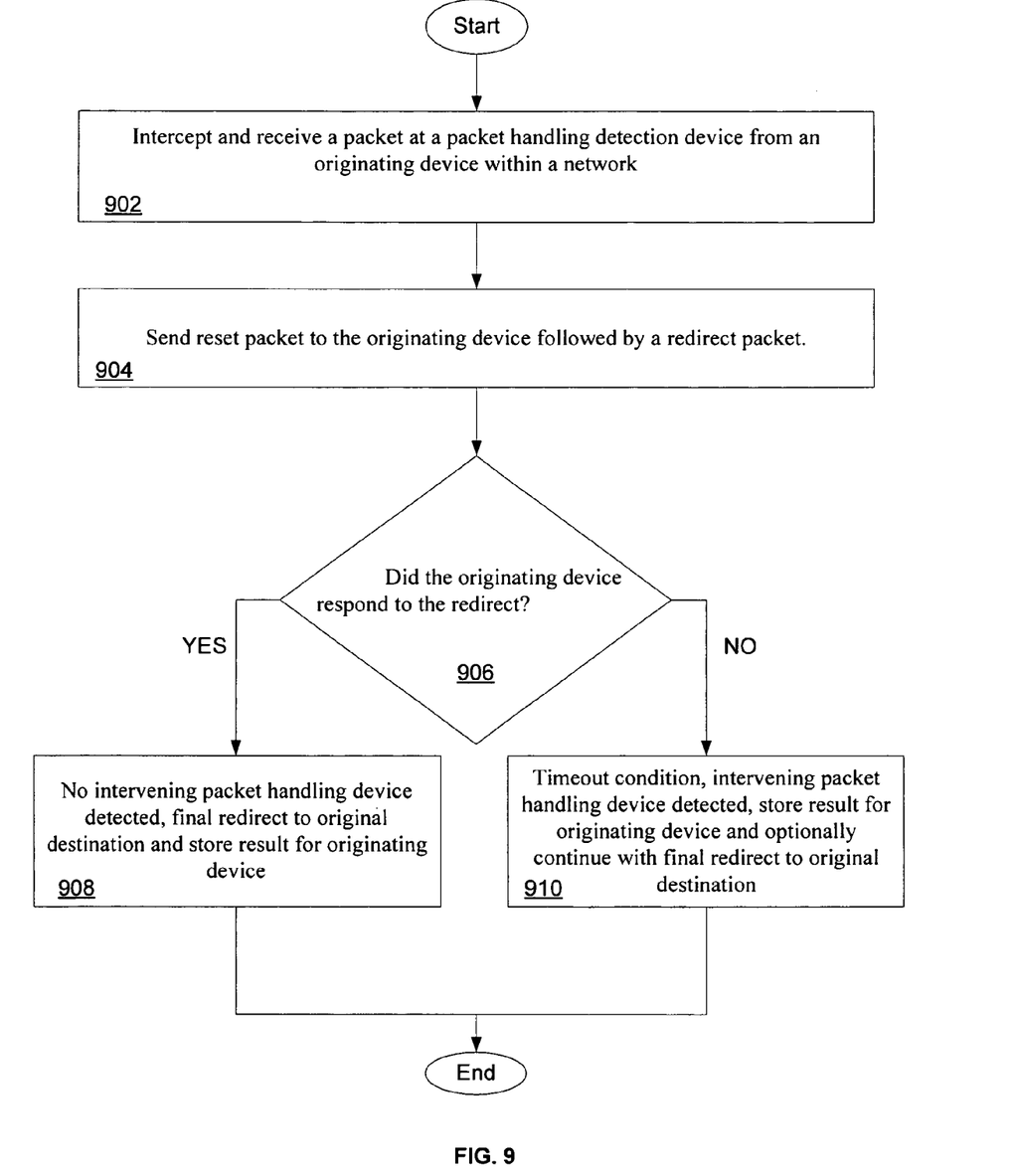
FIG. 9 is a flow chart illustration operations pertaining to detecting a packet handling device using an active detection method of monitoring for responses associated with a TCP redirect to an originating device after a reset packet is sent, according to one embodiment of the invention.

FIG. 9 is a flow chart illustration operations pertaining to detecting a packet handling device using an active detection method of monitoring for responses associated with a TCP redirect to an originating device after a reset packet is sent, according to one embodiment of the invention. At operation 902, a packet at a packet handling detection device is received from an originating device within a network. At operation 904 and 906, a reset packet is directed toward the originating device followed by a redirect (or other packet requiring a response) and the packet handling detection device monitors for a response from the originating device to the redirect. If the redirect is responded to by the originating device, at operation 908, then no intervening packet handling device is detected and a final redirect to original destination is made and the result is stored for originating device. However, if a timeout occurs because there is no response to the redirect by the originating device because an intervening packet handling device has reset, at operation 910, then the intervening packet handling device is detected, the result is stored for originating device, and a final redirect to original destination may optionally be made.

Figure 10:
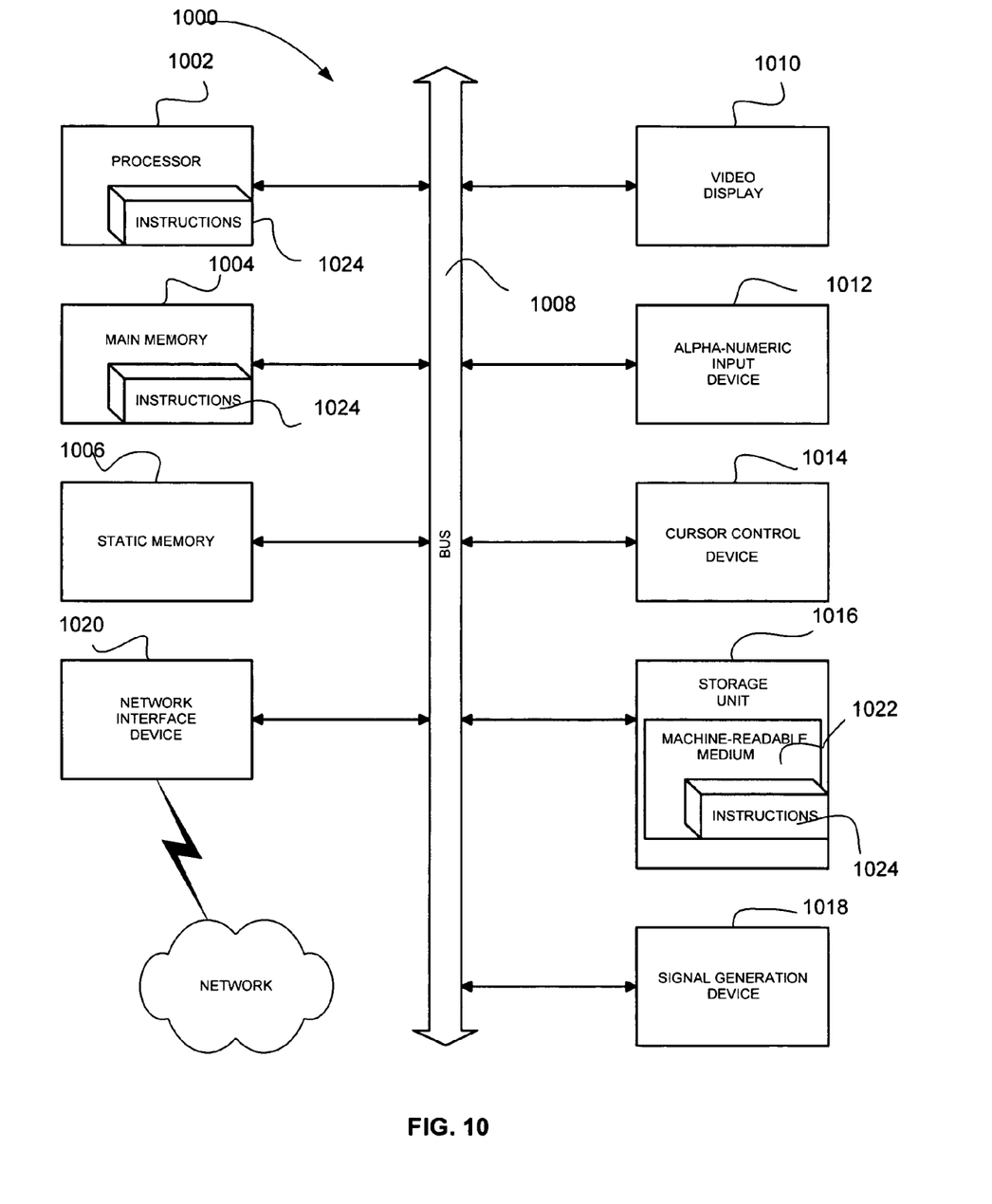
FIG. 10 illustrates a diagrammatic representation of machine in the exemplary form of a computer system within which a set of instructions may be executed to cause the machine to perform any one or more of the methodologies discussed herein.

FIG. 10 illustrates a diagrammatic representation of machine in the exemplary form of a computer system 1000 within which a set of instructions may be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a storage unit 1016 (e.g., hard-disk drive), a signal generation device 1018 (e.g., a speaker) and a network interface device 1020.

The storage unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media. The software 1024 may further be transmitted or received over a network 1026 via the network interface device 1020.

While the machine-readable medium 1022 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media.

Referring to FIGS. 5 through 9, although the embodiments of the processing device programming method is shown in the form of flow charts having separate blocks and arrows, the operations described in a single block do not necessarily constitute a process or function that is dependent on or independent of the other operations described in other blocks. Furthermore, the order in which the operations are described herein is merely illustrative, and not limiting, as to the order in which such operations may occur in alternate embodiments. For example, some of the operations described may occur in series, in parallel, or in an alternating and/or iterative manner.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

We claim:

1. A method, comprising:
    detecting a packet handling device that performs network address translations between an originating device and a detection device; and
    analyzing one or more transmission parameters of a packet received at the detection device to detect the packet handling device that performs network address translations, wherein analyzing further includes comparing a first transmission parameter of the one or more transmission parameters to a standard transmission parameter, wherein the packet handling device is detected if the comparison of the first transmission parameter is not equal to the standard transmission parameter, and wherein the first transmission parameter is a time to live (TTL) value and the standard transmission parameter is a standard TTL value.

2. A method, comprising:
    detecting a packet handling device that performs network address translations between an originating device and a detection device; and
    analyzing one or more transmission parameters of a packet received at the detection device to detect the packet handling device that performs network address translations, wherein analyzing one or more transmission parameters comprises:
    sending a reset command packet followed by a general request packet from the detecting device to a network address corresponding to the originating device, wherein the reset command packet includes an out of range sequence number; and
    determining the presence of the packet handling device between the originating device and the detection device if the detecting device does not receive a response to the general request within a timeout period.

3. The method of claim 2, wherein the general request packet is a redirect packet.

4. The method of claim 2, wherein the detecting device is a xDSL (Digital Subscriber Line) portal.

5. The method of claim 2, wherein the detecting device is a packet switching device.

6. The method of claim 2, wherein the packet is at least one of a hyper text transfer protocol packet or user datagram protocol packet.

7. An apparatus, comprising:
    a detecting device to detect one or more transmission parameters of a packet received at the detection device to detect a packet handling device that performs network address translations between an originating device and the detection device;
    a comparator to compare a first transmission parameter of the one or more transmission parameters detected by the detecting device to a standard transmission parameter, wherein the packet handling device is detected if the comparison of the first transmission parameter is not equal to the standard transmission parameter, and wherein the first transmission parameter is a time to live (TTL) value and the standard transmission parameter is a standard TTL value.

8. An apparatus, comprising:
    a detecting device to detect one or more transmission parameters of a packet received at the detection device to detect a packet handling device that performs network address translations between an originating device and the detection device, wherein the detecting device to detect the one or more transmission parameters by transmitting a redirect packet to the originating device and to send another redirect packet for every redirect response received in response to the previous redirect packet, wherein the packet handling device is detected if a redirect response is not received within a timeout period in response to one of the redirect packets.

9. The apparatus of claim 8, wherein each redirect packet includes a unique network address within a private network associated with the detecting device.

10. An apparatus, comprising:
    a detecting device to detect one or more transmission parameters of a packet received at the detection device to detect a packet handling device that performs network address translations between an originating device and the detection device, wherein to analyze one or more transmission parameters the detecting device further to send a reset command packet followed by a general request packet from the detecting device to a network address corresponding to the originating device, wherein the reset command includes an out of range sequence number and to determine the presence of the packet handling device between the originating device and the detection device if the detecting device does not receive a response to the general request within a timeout period.

11. The apparatus of claim 10, wherein the general request packet is a redirect packet.

12. The apparatus of claim 10, wherein the detecting device is a packet switching device.

13. A machine readable storage medium having embodied thereon an instruction set, the instruction set being executable by a machine to perform operations, comprising:
    detecting a packet handling device that performs network address translations between an originating device and a detection device; and
    analyzing one or more transmission parameters of a packet received at the detection device to detect the packet handling device that performs network address translations, wherein analyzing further includes comparing a first transmission parameter of the one or more transmission parameters to a standard transmission parameter, wherein analyzing one or more transmission parameters comprises:
    sending a reset command packet followed by a general request packet from the detecting device to a network address corresponding to the originating device, wherein the reset command packet includes an out of range sequence number; and
    determining the presence of the packet handling device between the originating device and the detection device if the detecting device does not receive a response to the general request within a timeout period.

* * * * *

UNITED STATES PATENT AND TRADEMARK OFFICE
CERTIFICATE OF CORRECTION

PATENT NO. : 7,599,365 B1  Page 1 of 1
APPLICATION NO. : 11/249989
DATED : October 6, 2009
INVENTOR(S) : Sabol et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Twenty-eighth Day of September, 2010

David J. Kappos
*Director of the United States Patent and Trademark Office*